US011160078B2

(12) United States Patent
Ishiguro et al.

(10) Patent No.: US 11,160,078 B2
(45) Date of Patent: *Oct. 26, 2021

(54) BACKHAUL RADIO WITH ADAPTIVE BEAMFORMING AND SAMPLE ALIGNMENT

(71) Applicant: SKYLINE PARTNERS TECHNOLOGY LLC, Boulder, CO (US)

(72) Inventors: Arthur Ishiguro, Santa Clara, CA (US); Adnan Raja, Santa Clara, CA (US); Badri Varadarajan, Mountain View, CA (US); Kevin J. Negus, Philipsburg, MT (US)

(73) Assignee: SKYLINE PARTNERS TECHNOLOGY, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,976

(22) Filed: Jun. 15, 2020

(65) Prior Publication Data
US 2020/0314849 A1 Oct. 1, 2020

Related U.S. Application Data

(63) Continuation of application No. 15/825,032, filed on Nov. 28, 2017, now Pat. No. 10,716,111, which is a
(Continued)

(51) Int. Cl.
*H04W 72/04* (2009.01)
*H04W 84/12* (2009.01)
(Continued)

(52) U.S. Cl.
CPC ........ *H04W 72/0453* (2013.01); *H01Q 1/246* (2013.01); *H01Q 3/24* (2013.01);
(Continued)

(58) Field of Classification Search
None
See application file for complete search history.

(56) References Cited

U.S. PATENT DOCUMENTS

D307,274 S  4/1990  Sasaki et al.
D335,128 S  4/1993  Soren
(Continued)

FOREIGN PATENT DOCUMENTS

EP  2745539  6/2014
EP  2767102  8/2014
(Continued)

OTHER PUBLICATIONS

"AccessGate—RAN Optimization for Mobile Backhaul Systems," Product Data Sheet, Memotec, 2009, Montreal, Quebec, Canada, 2 pages.
(Continued)

*Primary Examiner* — Hassan A Phillips
*Assistant Examiner* — Gautam Sharma
(74) *Attorney, Agent, or Firm* — Jennifer Hayes; Nixon Peabody LLP

(57) ABSTRACT

A backhaul radio is disclosed that operates in multipath propagation environments such as obstructed LOS conditions with uncoordinated interference sources in the same operating band. Such a backhaul radio may use adaptive beamforming and sample alignment at the transmitter to enhance the link performance. Such backhaul radios may communicate with each other to compute and apply optimal beamforming parameters for a particular propagation environment through a closed-loop feedback mechanism.

16 Claims, 6 Drawing Sheets

Related U.S. Application Data continuation-in-part of application No. 15/651,707, filed on Jul. 17, 2017, now Pat. No. 10,548,132, which is a continuation of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318, said application No. 15/825,032 is a continuation-in-part of application No. 15/595,172, filed on May 15, 2017, now Pat. No. 10,051,643, which is a continuation of application No. 15/285,354, filed on Oct. 4, 2016, now Pat. No. 9,655,133, which is a continuation of application No. 15/060,013, filed on Mar. 3, 2016, now Pat. No. 9,474,080, which is a continuation of application No. 14/688,550, filed on Apr. 16, 2015, now Pat. No. 9,313,674, which is a continuation of application No. 14/498,959, filed on Sep. 26, 2014, now Pat. No. 9,049,611, which is a continuation-in-part of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(60) Provisional application No. 62/427,055, filed on Nov. 28, 2016, provisional application No. 62/430,229, filed on Dec. 5, 2016, provisional application No. 61/910,194, filed on Nov. 29, 2013.

(51) Int. Cl.

| | | |
|---|---|---|
| *H04B 7/04* | (2017.01) | |
| *H04W 52/52* | (2009.01) | |
| *H01Q 5/50* | (2015.01) | |
| *H04L 27/26* | (2006.01) | |
| *H04L 25/03* | (2006.01) | |
| *H04L 5/14* | (2006.01) | |
| *H04L 5/00* | (2006.01) | |
| *H04L 27/01* | (2006.01) | |
| *H04W 24/02* | (2009.01) | |
| *H01Q 25/00* | (2006.01) | |
| *H01Q 21/29* | (2006.01) | |
| *H01Q 21/24* | (2006.01) | |
| *H01Q 1/24* | (2006.01) | |
| *H04L 1/00* | (2006.01) | |
| *H01Q 21/06* | (2006.01) | |
| *H01Q 21/20* | (2006.01) | |
| *H01Q 3/24* | (2006.01) | |
| *H04B 7/06* | (2006.01) | |
| *H04L 25/02* | (2006.01) | |
| *H04B 1/04* | (2006.01) | |
| *H04L 1/16* | (2006.01) | |
| *H04W 76/27* | (2018.01) | |
| *H04L 27/00* | (2006.01) | |

(52) U.S. Cl.
CPC ............ *H01Q 5/50* (2015.01); *H01Q 21/061* (2013.01); *H01Q 21/205* (2013.01); *H01Q 21/24* (2013.01); *H01Q 21/29* (2013.01); *H01Q 25/00* (2013.01); *H01Q 25/005* (2013.01); *H04B 7/04* (2013.01); *H04B 7/063* (2013.01); *H04B 7/0617* (2013.01); *H04L 1/00* (2013.01); *H04L 1/0003* (2013.01); *H04L 5/006* (2013.01); *H04L 5/0007* (2013.01); *H04L 5/0023* (2013.01); *H04L 5/0028* (2013.01); *H04L 5/0048* (2013.01); *H04L 5/14* (2013.01); *H04L 5/143* (2013.01); *H04L 25/0204* (2013.01); *H04L 25/0224* (2013.01); *H04L 25/03019* (2013.01); *H04L 27/01* (2013.01); *H04L 27/2636* (2013.01); *H04L 27/2678* (2013.01); *H04W 24/02* (2013.01); *H04W 52/52* (2013.01); *H04W 72/04* (2013.01); *H04W 84/12* (2013.01); *H04B 2001/0408* (2013.01); *H04L 1/0009* (2013.01); *H04L 1/1607* (2013.01); *H04L 1/1671* (2013.01); *H04L 27/0008* (2013.01); *H04L 27/265* (2013.01); *H04L 2025/03414* (2013.01); *H04W 76/27* (2018.02)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 5/1999 | Chu et al. |
| 5,973,613 A | 10/1999 | Reis |
| RE36,591 E | 2/2000 | Hayashi et al. |
| 6,253,060 B1 | 6/2001 | Komara et al. |
| 6,310,584 B1 | 10/2001 | Reece et al. |
| 6,359,596 B1 | 3/2002 | Claiborne |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,539,209 B1 | 3/2003 | Dajer |
| 6,697,642 B1 | 2/2004 | Thomas |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,076,168 B1 | 7/2006 | Shattil |
| 7,133,672 B2 | 11/2006 | Sayeedi |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,289,478 B1 | 10/2007 | Kim et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |
| 7,978,144 B2 | 7/2011 | Tanabe et al. |

(56) References Cited

U.S. PATENT DOCUMENTS

| | | |
|---|---|---|
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,638,839 B2 | 1/2014 | Negus et al. |
| 8,649,418 B1 | 2/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,179,240 B2 | 11/2015 | Negus et al. |
| 9,226,295 B2 | 12/2015 | Negus et al. |
| 9,226,315 B2 | 12/2015 | Negus et al. |
| 9,282,560 B2 | 3/2016 | Negus et al. |
| 9,350,411 B2 | 5/2016 | Lea et al. |
| 9,374,822 B2 | 6/2016 | Negus et al. |
| 9,572,163 B2 | 2/2017 | Negus et al. |
| 9,577,700 B2 | 2/2017 | Lea et al. |
| 9,577,733 B2 | 2/2017 | Negus et al. |
| 9,578,643 B2 | 2/2017 | Negus |
| 9,609,530 B2 | 3/2017 | Lea et al. |
| 9,655,133 B2 | 5/2017 | Negus et al. |
| 9,712,216 B2 | 7/2017 | Lea et al. |
| 9,713,019 B2 | 7/2017 | Negus et al. |
| 9,713,155 B2 | 7/2017 | Negus et al. |
| 9,713,157 B2 | 7/2017 | Negus et al. |
| 9,876,530 B2 | 1/2018 | Negus et al. |
| 10,051,643 B2 | 8/2018 | Negus et al. |
| 10,129,888 B2 | 11/2018 | Negus et al. |
| 10,135,501 B2 | 11/2018 | Lea et al. |
| 10,237,760 B2 | 3/2019 | Negus et al. |
| 10,284,253 B2 | 5/2019 | Negus et al. |
| 10,306,635 B2 | 5/2019 | Negus et al. |
| 10,313,898 B2 | 6/2019 | Lea et al. |
| 10,506,611 B2 | 12/2019 | Negus et al. |
| 10,548,707 B2 | 1/2020 | Negus |
| 10,700,733 B2 | 6/2020 | Negus et al. |
| 10,708,918 B2 | 7/2020 | Negus et al. |
| 10,716,111 B2 | 7/2020 | Ishiguro et al. |
| 10,720,969 B2 | 7/2020 | Lea et al. |
| 2001/0003443 A1 | 6/2001 | Velazquez |
| 2001/0030939 A1 | 10/2001 | Vijayan et al. |
| 2001/0033247 A1 | 10/2001 | Singer |
| 2001/0035844 A1 | 11/2001 | Reece et al. |
| 2001/0038674 A1 | 11/2001 | Trans |
| 2001/0049295 A1 | 12/2001 | Matsuoka |
| 2001/0050927 A1 | 12/2001 | Johnson |
| 2002/0008672 A1 | 1/2002 | Gothard |
| 2002/0048062 A1 | 4/2002 | Sakamoto |
| 2002/0060993 A1 | 5/2002 | Dent |
| 2002/0064141 A1 | 5/2002 | Sakakura |
| 2002/0077068 A1 | 6/2002 | Dent |
| 2002/0111182 A1 | 8/2002 | Sawyer |
| 2002/0136170 A1 | 9/2002 | Struhsaker |
| 2002/0146029 A1* | 10/2002 | Kavak ............... H04J 13/18 370/441 |
| 2003/0064753 A1 | 4/2003 | Kasapi |
| 2003/0073463 A1 | 4/2003 | Shapira |
| 2003/0086366 A1 | 5/2003 | Branlund et al. |
| 2003/0119501 A1 | 6/2003 | Kim |
| 2003/0123384 A1 | 7/2003 | Agee |
| 2003/0123406 A1 | 7/2003 | Yavuz |
| 2003/0124976 A1 | 7/2003 | Tamaki |
| 2003/0153361 A1 | 8/2003 | Mori |
| 2003/0162566 A1 | 8/2003 | Shapira |
| 2004/0006573 A1 | 1/2004 | Takashi |
| 2004/0014429 A1 | 1/2004 | Guo |
| 2004/0018843 A1 | 1/2004 | Cerwall |
| 2004/0063406 A1 | 4/2004 | Petrus |
| 2004/0063450 A1 | 4/2004 | Uhlik |
| 2004/0095907 A1 | 5/2004 | Agee |
| 2004/0132454 A1 | 7/2004 | Trott |
| 2004/0137924 A1 | 7/2004 | Herscovich et al. |
| 2004/0151238 A1 | 8/2004 | Masenten |
| 2004/0157613 A1 | 8/2004 | Steer |
| 2004/0165650 A1 | 8/2004 | Miyazaki et al. |
| 2004/0198452 A1 | 10/2004 | Roy |
| 2004/0259497 A1 | 12/2004 | Dent |
| 2004/0259565 A1 | 12/2004 | Lucidame |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0164664 A1 | 7/2005 | DiFonzo |
| 2005/0202828 A1 | 9/2005 | Pecen |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0181456 A1 | 8/2006 | Dai |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0030116 A1 | 2/2007 | Feher |
| 2007/0097899 A1 | 5/2007 | Larsson et al. |
| 2007/0140374 A1 | 6/2007 | Raleigh |
| 2007/0146225 A1 | 6/2007 | Boss et al. |
| 2007/0155431 A1 | 7/2007 | Munzner et al. |
| 2007/0165552 A1 | 7/2007 | Kasapi |
| 2007/0183439 A1 | 8/2007 | Osann |
| 2007/0189408 A1 | 8/2007 | Waxman |
| 2007/0195736 A1 | 8/2007 | Taira |
| 2007/0218910 A1 | 9/2007 | Hill |
| 2007/0222697 A1 | 9/2007 | Caimi |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |
| 2008/0181183 A1 | 7/2008 | Gale |
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0029645 A1 | 1/2009 | Leroudier |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0231197 A1 | 9/2009 | Richards |
| 2009/0252134 A1 | 10/2009 | Schlicht et al. |
| 2009/0252250 A1 | 10/2009 | Heath, Jr. |
| 2009/0264087 A1 | 10/2009 | Chae |
| 2009/0274130 A1 | 11/2009 | Boch |
| 2009/0286506 A1 | 11/2009 | Gu |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046421 A1 | 2/2010 | Adams |
| 2010/0046439 A1 | 2/2010 | Chen et al. |
| 2010/0046462 A1 | 2/2010 | Uwano |

(56) References Cited

U.S. PATENT DOCUMENTS

| | | |
|---|---|---|
| 2010/0056205 A1 | 3/2010 | Fuss |
| 2010/0087158 A1 | 4/2010 | Chen |
| 2010/0104038 A1 | 4/2010 | Stager |
| 2010/0128630 A1 | 5/2010 | Barak et al. |
| 2010/0157970 A1 | 6/2010 | Gotman et al. |
| 2010/0172422 A1 | 7/2010 | Maruyama |
| 2010/0202391 A1 | 8/2010 | Palanki et al. |
| 2010/0261423 A1 | 10/2010 | Stanforth et al. |
| 2010/0266062 A1 | 10/2010 | Mussmann |
| 2010/0269143 A1 | 10/2010 | Rabowsky |
| 2010/0272006 A1 | 10/2010 | Bertrand et al. |
| 2010/0302101 A1 | 12/2010 | Leiba et al. |
| 2010/0303015 A1 | 12/2010 | Ko |
| 2010/0309048 A1 | 12/2010 | Polisetty et al. |
| 2011/0044279 A1 | 2/2011 | Johansson et al. |
| 2011/0065448 A1 | 3/2011 | Song |
| 2011/0070855 A1 | 3/2011 | Mariotti |
| 2011/0085525 A1 | 4/2011 | Patini |
| 2011/0090885 A1 | 4/2011 | Safavi |
| 2011/0103292 A1 | 5/2011 | Pasad et al. |
| 2011/0164186 A1 | 7/2011 | Sadek |
| 2011/0182174 A1 | 7/2011 | Pi et al. |
| 2011/0206155 A1 | 8/2011 | Fujimura et al. |
| 2011/0235514 A1 | 9/2011 | Huang et al. |
| 2011/0250852 A1 | 10/2011 | Greene |
| 2012/0058777 A1 | 3/2012 | Nguyen et al. |
| 2012/0063472 A1 | 3/2012 | Le Pallec et al. |
| 2012/0108284 A1* | 5/2012 | Patel ............... H04B 1/0003 455/509 |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0201153 A1 | 8/2012 | Bharadia et al. |
| 2012/0201173 A1 | 8/2012 | Jain et al. |
| 2012/0213086 A1 | 8/2012 | Matsuura et al. |
| 2012/0224574 A1 | 9/2012 | Hoymann et al. |
| 2012/0262576 A1 | 10/2012 | Schrist |
| 2013/0044028 A1 | 2/2013 | Lea et al. |
| 2013/0089037 A1 | 4/2013 | Negus et al. |
| 2013/0089041 A1 | 4/2013 | Negus et al. |
| 2013/0089083 A1 | 4/2013 | Negus et al. |
| 2013/0095765 A1 | 4/2013 | Greene |
| 2013/0137444 A1 | 5/2013 | Ozluturk |
| 2013/0207841 A1 | 8/2013 | Negus et al. |
| 2013/0288593 A1 | 10/2013 | Norin et al. |
| 2014/0050126 A1 | 2/2014 | Naden |
| 2014/0120966 A1 | 5/2014 | Fischer et al. |
| 2014/0184455 A1 | 7/2014 | Lea et al. |
| 2015/0016561 A1 | 1/2015 | Negus et al. |
| 2015/0084826 A1 | 3/2015 | Lea et al. |
| 2015/0156777 A1 | 6/2015 | Negus et al. |
| 2015/0200709 A1 | 7/2015 | Negus et al. |
| 2015/0223082 A1 | 8/2015 | Negus et al. |
| 2015/0230105 A1 | 8/2015 | Negus et al. |
| 2015/0372738 A1 | 12/2015 | Negus et al. |
| 2016/0004522 A1 | 1/2016 | Connelly |
| 2016/0013831 A1 | 1/2016 | Lea et al. |
| 2016/0095107 A1 | 3/2016 | Negus et al. |
| 2016/0095121 A1 | 3/2016 | Negus et al. |
| 2016/0135191 A1 | 5/2016 | Negus et al. |
| 2016/0135192 A1 | 5/2016 | Negus |
| 2016/0192374 A1 | 6/2016 | Negus |
| 2016/0248467 A1 | 8/2016 | Lea et al. |
| 2016/0285532 A1 | 9/2016 | Negus et al. |
| 2016/0285611 A1 | 9/2016 | Fischer et al. |
| 2016/0316477 A1 | 10/2016 | Negus et al. |
| 2017/0026978 A1 | 1/2017 | Negus et al. |
| 2017/0126291 A1 | 5/2017 | Negus et al. |
| 2017/0127399 A1 | 5/2017 | Negus et al. |
| 2017/0127421 A1 | 5/2017 | Negus et al. |
| 2017/0201025 A1 | 7/2017 | Lea et al. |
| 2017/0251484 A1 | 10/2017 | Negus |
| 2017/0311307 A1 | 10/2017 | Negus |
| 2017/0317725 A1 | 11/2017 | Lea |
| 2017/0318482 A1 | 11/2017 | Negus |
| 2017/0318571 A1 | 11/2017 | Negus |
| 2017/0318589 A1 | 11/2017 | Negus |
| 2018/0084553 A1 | 3/2018 | Boyer |
| 2018/0092099 A1 | 3/2018 | Ishiguro |
| 2018/0145721 A1 | 5/2018 | Negus |
| 2019/0007950 A1 | 1/2019 | Negus |
| 2019/0044581 A1 | 2/2019 | Lea et al. |
| 2019/0045492 A1 | 2/2019 | Negus et al. |
| 2019/0159045 A1 | 5/2019 | Negus |
| 2019/0190565 A1 | 6/2019 | Negus et al. |
| 2019/0246402 A1 | 8/2019 | Negus et al. |
| 2019/0253903 A1 | 8/2019 | Lea et al. |
| 2020/0077413 A1 | 3/2020 | Negus et al. |
| 2020/0313730 A1 | 10/2020 | Lea et al. |
| 2020/0314833 A1 | 10/2020 | Negus et al. |
| 2020/0314848 A1 | 10/2020 | Boyer et al. |
| 2020/0322000 A1 | 10/2020 | Negus |
| 2020/0329467 A1 | 10/2020 | Negus et al. |
| 2020/0383107 A1 | 12/2020 | Negus et al. |
| 2020/0396622 A1 | 12/2020 | Negus et al. |

FOREIGN PATENT DOCUMENTS

| | | |
|---|---|---|
| EP | 2839693 | 2/2015 |
| EP | 2843863 A1 | 3/2015 |
| WO | WO 2007/146685 | 12/2007 |
| WO | WO 2008007375 A2 | 1/2008 |
| WO | WO 2011030960 A1 | 3/2011 |
| WO | WO 2011080299 A3 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

"Advances in Backhaul Synchronization—Maximizing ROI," Application Brief, Symmetricom Inc., 2008, 6 pages.

"Carrier Ethernet Services Overview," Presentation, MEF, Aug. 2008, 32 pages.

"Clock Distribution and Synchronization over Ethernet: IEEE1588v2 and SyncE," Presentation, VITESSE, Sep. 2009, 9 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

"DAN2400-PTP—Open SoC Platform for Sub-6GHz Wireless Point-to-Point Systems," DesignArt Networks, Jul. 2008, 2 pages.

"Doubling Capacity in Wireless Channels," Provigent Inc., 2008, 3 pages.

"Evolving Microwave Mobile Backhaul for Next-Generation Networks," White Paper, NEC Corp., Feb. 2008, 4 pages.

"GainSpan GS1011M Low Power Wi-Fi® Module Family," Product Brief—Preliminary, GainSpan Corp., 2009, 2 pages.

"HMC536MS8G / 536MS8GE—GaAs MMIC Positive Control T/R Switch, DC-6 GHz," Data Sheet, Switches—SMT, Hittite Microwave Corp., 2008, pp. 10.295-10.299.

"IEEE 1588v2 (Precision Time Protocol) Testing," Application Note, IXIA, Dec. 2009.

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.

"MGA-21108—Broadband Fully Integrated Matched Low-Noise Amplifier MMIC," Data Sheet, Avago Technologies, Aug. 2009, 21 pages.

"MGA-22003—2.3-2.7 GHz 3×3mm WiMAX/WiBro and WiFi Linear Amplifier Module," Data Sheet, Avago Technologies, Mar. 2010, 15 pages.

"MGA-23003—3.3-3.8 GHz 3×3mm WiMAX Power Amplifier," Data Sheet, Avago Technologies, Mar. 2010, 16 pages.

"MGA-25203—5.1-5.9GHz 3×3mm WiFi and WiMAX Power Amplifier," Data Sheet, Avago Technologies, Mar. 2010, 14 pages.

(56) References Cited

OTHER PUBLICATIONS

"MGA-43328—High Linearity Wireless Data Power Amplifier for 2.5 to 2.7 GHz Applications," Application Note, Avago Technologies, Apr. 2010, 10 pages.

"MGA-43328—(2.5-2.7) GHz 29dBm High Linearity Wireless Data Power Amplifier," Data Sheet, Avago Technologies, Mar. 2010, 19 pages.

"MGA-645T6—Low Noise Amplifier with Bypass/Shutdown Mode in Low Profile Package," Data Sheet, Avago Technologies, Nov. 2009, 16 pages.

"MGA-655T6—Low Noise Amplifier with Bypass Mode in Low Profile Package," Data Sheet, Avago Technologies, Nov. 2009, 14 pages.

"MGA-675T6—Low Noise Amplifier with Shutdown Mode in Low Profile Package for 4.9-6 GHz Application," Data Sheet, Avago Technologies, Nov. 2009, 16 pages.

"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.

"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.

"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e-2005 and IEEE Std 802.16-2004/Cor1-2005, Feb. 2006, 864 pages.

"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.

"PC203-PC203-10—Basestation PHY Processor," Wireless Communications Processors, Product Brief, picoChip Flexible Wireless, 2008, 4 pages.

"SC-FDMA—Single Carrier FDMA in LTE," Data Sheet, IXIA Corp., Nov. 2009, 16 pages.

"Spectrum Sharing: The Promise and the Reality", RYSAVY Research, LLC, White Paper, Jul. 2012, pp. 1-12, available at http://www.rysavy.com.

"Technical Report: Electromagenetic Compatibility and Radio Spectrum Matters (ERM); System Reference Document (SRdoc); Mobile Broadband Services in the 2 300 MHz-2 400 MHz frequency band under Licensed Shared Access Regime", ETSI TR 103 113 V1.1.1 (Jul. 2013), European Telecommunications Standards Institute, France, 2013, pp. 1-37.

"Understanding MPLS-TP and Its Benefits," White Paper, Cisco Systems Inc., 2009, 6 pages.

"WiMAX/WiBro RF MxFE Transceiver, AD9352," Data Sheet, Analog Devices, 2007.

"WiMAX RF MxFE Transceiver, AD9352-5," Data Sheet, Analog Devices, 2008.

"WiMAX RF MxFE Transceiver, AD9353," Data Sheet, Analog Devices, 2007.

"WiMAX/WiBro RF MxFE MISO Transceiver, AD9354," Data Sheet, Analog Devices, 2008-2009.

"WiMAX/WiBro RF MxFE MISO Transceiver, AD9355," Data Sheet, Analog Devices, 2008-2009.

"WiMAX/BWA/WiBRO/LTE RF MxFE 2×2 MIMO Transceiver, AD9356," Data Sheet, Analog Devices, 2010.

"WiMAX/BWA/LTE RF MxFE 2×2 MIMO Transceiver, AD9357," Data Sheet, Analog Devices, 2010.

Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.

Beller, D. et al., "MPLS-TP—The New Technology for Packet Transport Networks," Alcatel-Lucent Deutschland AG, Stuttgart, 2009, 11 pages.

Chundury, R., "Mobile Broadband Backhaul: Addressing the Challenge," Planning Backhaul Networks, Ericsson Review, 2008, pp. 4-9.

Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.

Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.

Coon, J.P. et al., "An Investigation of MIMO Single-Carrier Frequency-Domain MMSE Equalization," Centre for Communications Research, University of Bristol, Sep. 2002, 4 pages.

Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.

Falconer, D.D. et al., "Broadband Wireless Using Single Carrier and Frequency Domain Equalization," Invited Overview Paper for WPMC '02, Honolulu, Oct. 2002, 10 pages.

Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.

Frost, D. et al., "MPLS Transport Profile Data Plane Architecture," Internet Engineering Task Force, RFC 5960, Aug. 2010, 16 pages.

Gao, S.C. et al., "Dual-polarized slot coupled planar antenna with wide bandwidth," IEEE Trans. Antennas and Propagation, vol. 51, No. 3, pp. 441-448, 2003.

Garner, G.M., "IEEE 1588 Version 2," ISPCS Ann Arbor '08, Sep. 2008, 89 pages.

Hentschel, T. et al., "The Digital Front-End—Bridge Between RF and Baseband-Processing," Software Defined Radio: Enabling Technologies by Walter Tuttlebee, Chapter 6, Jun. 2002, 58 pages.

Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.

Nathanzon, G. et al., "Cost-Effective Backhaul Alternatives for WiMAX Networks: Challenges & Solutions," Provigent Inc., Jun. 2008, 16 pages.

Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.

Pancaldi, F. et al., "Single-Carrier Frequency Domain Equalization—A Focus on Wireless Applications," IEEE Signal Processing Magazine, Sep. 2008, 22 pages.

Pozar, D.M. et al., "Improved coupling for aperature-coupled microstrip antennas," Electron. Lett., vol. 27, No. 13, pp. 1129-1131, 1991.

Pozar, D.M., "A microstrip antenna aperature-coupled to a microstripline," Electron. Lett., vol. 21, No. 2, pp. 49-50, 1985.

Sharony, J., "Introduction to Wireless MIMO—Theory and Applications," CEWIT—Center of Excellence in Wireless and Informational Technology, Stony Brook University, IEEE LI, Nov. 15, 2006, 63 pages.

Soffer, R., "Microwave Wireless Backhaul for LTE Networks—Meeting the Rapidly-Increasing Demand for Mobile Data," Provigent Inc., Jan. 2010, 18 pages.

Soffer, R., "ProviBand—Next Generation Wireless Backhaul Technology," Technical White Paper, Provigent Inc., Jan. 2006, 13 pages.

Stuber, G.L. et al., "Broadband MIMO-OFDM Wireless Communications," Invited Paper, Proceedings of the IEEE, vol. 92, No. 2, Feb. 2004, pp. 271-294.

(56) References Cited

OTHER PUBLICATIONS

Tubbax, J., "OFDM Versus Single Carrier with Cyclic Prefix: A System-based Comparison for Binary Modulation," IMEC, Belgium, Jan. 2011, 4 pages.

"TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15—Radio Frequency Devices, Subpart H—Television Band Devices (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8&idno=47, retrieved Feb. 25, 2015).

Partial European Search Report in European Patent Application No. 12839752.8, dated Jun. 16, 2015.

International Search Report and Written Opinion for PCT Application No. PCT/US2012/049948 dated Oct. 22, 2012.

International Search Report and Written Opinion for PCT Application No. PCT/US2012/059797 dated Jan. 2, 2013.

International Search Report and Written Opinion for PCT Application No. PCT/US2013/029731 dated May 13, 2013.

International Search Report and Written Opinion in PCT Application No. PCT/US013/48782, dated Jul. 29, 2013.

Extended European Search Report in European Patent Application No. 12824072.8, dated Jul. 15, 2015.

Extended European Search Report in European Patent Application No. 14177662.5, dated Feb. 3, 2015.

\* cited by examiner

BACKHAUL RADIO WITH ADAPTIVE BEAMFORMING AND SAMPLE ALIGNMENT

CROSS-REFERENCE TO RELATED APPLICATIONS

This application is a continuation of U.S. patent application Ser. No. 15/825,032, filed Nov. 28, 2017, which claims priority to U.S. Provisional Patent Application Ser. No. 62/427,055, filed on Nov. 28, 2016, and U.S. Provisional Patent Application Ser. No. 62/430,229, filed on Dec. 5, 2016, both entitled "Backhaul Radio with Adaptive Beamforming and Sample Alignment", the entireties of which are hereby incorporated by reference.

U.S. patent application Ser. No. 15/825,032 is a continuation-in-part application of U.S. patent application Ser. No. 15/651,707, filed on Jul. 17, 2017, now U.S. Pat. No. 10,548,132, which is a continuation of U.S. patent application Ser. No. 14/337,744, filed on Jul. 22, 2014, now U.S. Pat. No. 9,055,463, which claims priority to U.S. Pat. Nos. 8,811,365, 8,311,023 and 8,238,318, the disclosures of which are hereby incorporated herein by reference in their entirety.

U.S. patent application Ser. No. 15/825,032 is a continuation-in-part application of U.S. patent application Ser. No. 15/595,172, filed May 15, 2017, now U.S. Pat. No. 10,051,643, which is a continuation of U.S. patent application Ser. No. 15/285,354, filed on Oct. 4, 2016, now U.S. Pat. No. 9,655,133, which claims priority to U.S. Pat. Nos. 9,474,080, 9,313,674, 9,055,463, 9,049,611, 8,811,365, 8,311,023 and 8,238,318 and also claims priority to U.S. Provisional Patent Application Ser. No. 61/910,194, filed on Nov. 29, 2013, entitled "Extreme Interference Protection," the entirety of which is hereby incorporated by reference.

The present application is also related to U.S. patent application Ser. No. 15/651,270, filed on Jul. 17, 2017, which is a continuation of U.S. patent application Ser. No. 14/336,958, filed Jul. 21, 2014, now U.S. Pat. No. 9,001,809 and claims priority to U.S. Pat. Nos. 9,712,216, 9,577,700, 9,350,411, 9,178,558, 8,824,442, 8,467,363, 8,311,023 and 8,238,318, the disclosures of which are hereby incorporated herein by reference in their entirety.

The present application is also related to U.S. patent application Ser. No. 15/470,080, filed Mar. 27, 2017, which is a continuation of U.S. patent application Ser. No. 14/197,158, filed Mar. 4, 2014, now U.S. Pat. No. 8,928,542 and claims priority to U.S. Pat. Nos. 9,609,530, 8,811,365, 8,311,023 and 8,238,318, the disclosure of which is hereby incorporated herein by reference in its entirety.

The present application is also related to U.S. patent application Ser. No. 14/964,292, filed Dec. 9, 2015, which is a continuation of U.S. patent application Ser. No. 13/632,993, filed Oct. 1, 2012, now U.S. Pat. No. 9,226,315 and claims priority to U.S. Pat. Nos. 8,830,943, 8,761,100 and 8,300,590, the disclosures of which are hereby incorporated herein by reference in their entirety.

The present application is also related to U.S. patent application Ser. No. 15/291,968, filed on Oct. 12, 2016, which is a continuation of U.S. patent application Ser. No. 14/108,200, filed Dec. 16, 2013, now U.S. Pat. No. 8,948,235 and claims priority to U.S. Pat. Nos. 9,490,918, 8,638,839 and 8,422,540, the disclosures of which are hereby incorporated herein by reference in their entirety.

The present application is also related to U.S. patent application Ser. No. 15/651,207, filed on Jul. 17, 2017, which is a continuation-in-part of U.S. patent application Ser. No. 14/098,456, filed Dec. 5, 2013, now U.S. Pat. No. 8,989,762 and claims priority to U.S. Pat. Nos. 9,713,019, 9,055,463, 8,989,762, 8,811,365, 8,311,023 and 8,238,318, the disclosure of which is hereby incorporated herein by reference in its entirety.

The present application is also related to U.S. patent application Ser. No. 15/050,009, filed on Feb. 22, 2016, which is a continuation of U.S. patent application Ser. No. 14/151,190, filed Jan. 9, 2014, now U.S. Pat. No. 8,982,772 and claims priority to U.S. Pat. Nos. 9,345,036, 8,811,365, 8,311,023 and 8,238,318, the disclosure of which is hereby incorporated herein by reference in its entirety.

BACKGROUND

1. Field

The present disclosure relates generally to data networking and in particular to a backhaul radio for connecting remote edge access networks to core networks in RF bands subject to uncoordinated interference.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

In the conventional PTP radios 132, as described in greater detail in U.S. patent application Ser. No. 14/337,744 and incorporated herein, the antenna is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that a modem within such radios has insignificant impairments at the receiver due to multipath self-interference and further substantially reduces the likelihood of unwanted co-channel interference due to other nearby radio links. However, the conventional PTP radio on a whole is completely unsuitable for obstructed LOS or PMP operation.

In U.S. patent application Ser. No. 14/337,744 and the related applications and patents summarized above, a novel Intelligent Backhaul Radio (or "IBR") suitable for obstructed LOS and PMP or PTP operation is described in great detail in various embodiments of those inventions. When such IBRs (or other backhaul radios) are deployed in unlicensed or lightly licensed RF spectrum bands such as the Industrial, Scientific and Medical (or "ISM") bands at, for example, 2.4-2.4835 GHz, the proposed Citizens Broadband Radio Service (or "CBRS") band at, for example, 3.55-3.7 GHz, or the Unlicensed National Information Infrastructure (or "U-NII") band at, for example, various sub-bands within 5.15-5.925 GHz, then performance of such backhaul radios may be significantly impacted by both self-interference from other such backhaul radios and from uncoordinated interference by other transmitting devices. Such uncoordinated interference sources may include government radars, wireless local area networking devices compatible with the IEEE 802.11 family of standards (or "WiFi" devices), or cordless telephones. Backhaul radios such as IBRs can advantageously mitigate the effects of such interference by exploiting the frequency, time, spatial and cancellation domains. In an exemplary backhaul radio embodiment, an IBR determines instantaneous frequency, time, spatial and cancellation domain interference mitigation techniques using a radio resource controller (or "RRC") as also described in U.S. patent application Ser. No. 14/337,744 and the related applications and patents summarized above. However, previously known techniques for determining and implementing the specific radio resource selections have at least the significant deficiency that such techniques do not account for simultaneous resource allocation across multiple of these domains and for determining the optimal arrangement of such resources while simultaneously maintaining one or more high throughput and low latency backhaul links. Thus, there is a need in the art for developing backhaul radios that will select radio resources that provide high throughput, low latency and robustness to interference in consideration of multiple aspects of the frequency, time, spatial and cancellation domains in order to maximize the link performance of backhaul radios in the presence of self-generated and uncoordinated interference sources.

Multiple transmit antennas can be utilized to obtaining high performance through transmit beamforming. Transmit beamforming can increase the antenna gain by combining signals from multiple transmit antenna elements. Typically, antenna steering weights are applied at the transmitter in order to combine the signals in phase. The optimal weight depends on the channel characteristics between the transmitter and receiver. A closed-loop feedback from the receiver to the transmitter can be utilized to optimize the beamforming performance for a particular channel. For example, U.S. Pat. No. 8,577,302 discusses a method to apply closed-loop adaptive beamforming using sounding packets and receiver estimation. However, signals from distinct transmit antenna elements may also be offset in sample. In exemplary embodiments herein, both phase and sample alignment optimization are performed at the receiver, and fed back to the transmitter through a closed-loop feedback mechanism.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed invention are directed to measuring interference and channel conditions in the current channel as well as alternate channels while supporting data transmission on the wireless link. Backhaul radios for measuring interference and channel conditions across a multitude of frequencies and antennas to cover all possible channels are disclosed herein. Coordination between the transmitter and receiver of such radios uses a communication protocol sent with data to start operations on the same superframe boundary, including but not limited to frequency changes and blanking portions of data-carrying superframes periodically.

Additionally, embodiments of the claimed invention are directed to simultaneously optimizing interference mitigation resources in a backhaul radio in multiple of the frequency, time, spatial and cancellation domains.

According to an aspect of the invention, a backhaul radio is disclosed that includes a plurality of receive radio frequency (RF) chains, wherein each receive RF chain is capable of converting from one of a plurality of receive RF signals to a respective one of a plurality of receive chain output signals, and wherein each said receive RF signal is characterized by at least a channel center frequency and a channel bandwidth amongst either of a multitude of possible channel center frequencies or a multitude of possible channel bandwidths, respectively; a plurality of directive gain antenna elements; and one or more selectable RF connections for selectively coupling certain of the plurality of directive gain antenna elements to certain of the plurality of receive RF chains according to a set of selective coupling settings; wherein the backhaul radio is capable of determining a measure of interference associated with each of a plurality of combinations of channel center frequency, channel bandwidth, and set of selective coupling settings; wherein the backhaul radio is capable of determining or estimating one or more performance metrics associated with each combination of channel center frequency, channel bandwidth, and set of selective coupling settings, said determining or estimating of the one or more performance metrics being based at least upon the measure of interference; and wherein the backhaul radio is capable of changing from a first combination of channel center frequency, channel bandwidth, and set of selective coupling settings to a second combination of channel center frequency, channel bandwidth, and set of selective coupling settings, said changing being based at least upon an opportunity to improve at least one of the one or more performance metrics.

The backhaul radio may further include a radio resource controller, wherein the radio resource controller is capable of setting or causing to be set specific selective couplings between the certain of the plurality of directive gain antenna elements and the certain of the plurality of receive RF chains according to the set of selective coupling settings.

The backhaul radio may further include a backhaul management system agent that is capable of setting or causing to be set certain policies relevant to the radio resource controller, wherein the backhaul management system agent is capable of exchanging information with other backhaul management system agents within other backhaul radios or with one or more backhaul management system servers.

The information that can be exchanged with said backhaul management system agent can be used at least to set or cause to be set at least one of a channel center frequency, a specific selective coupling between at least one of the certain of the plurality of directive gain antenna elements and at least one of the certain of the plurality of receive RF chains, or a channel bandwidth.

The backhaul radio may further include one or more demodulator cores, wherein each demodulator core is capable of demodulating one or more of a plurality of receive symbol streams to produce one or more receive data interface streams; a frequency selective receive path channel multiplexer, interposed between the one or more demodulator cores and at least two of the plurality of receive RF chains, wherein the frequency selective receive path channel multiplexer is capable of generating the plurality of receive symbol streams from at least two of the plurality of receive chain output signals, and wherein frequency selective receive path channel multiplexer is capable of the determining the measure of interference associated with each of the plurality of combinations of channel center frequency, channel bandwidth, and set of selective coupling settings.

Each one of the plurality of receive RF chains may include at least a vector demodulator and two analog to digital converters that are capable of producing the respective one of the plurality of receive chain output signals, each said respective one of the plurality of receive chain output signals comprised of digital baseband quadrature signals.

At least one of the plurality of receive RF chains or at least one of the one or more selectable RF connections may include at least one downconverter capable of producing an intermediate frequency (IF) signal. The frequency selective receive path channel multiplexer may include at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

At least one of the one or more selectable RF connections may include at least one RF switch, and wherein at least one mapping of ports in the RF switch can be changed according to the set of selective coupling settings. At least one of the one or more selectable RF connections may include at least one RF or IF combiner or splitter with at least one adjustable path, and wherein at least one of a phase or amplitude for said at least one adjustable path can be changed according to the set of selective coupling settings.

The certain of the plurality of directive gain antenna elements that can be selectively coupled to the certain of the plurality of receive RF chains may include at least a first subset with a first polarization and a second subset with a second polarization.

Certain of the plurality of directive gain antenna elements that can be selectively coupled to the certain of the plurality of receive RF chains may be arranged on a plurality of facets with one or more directive gain antenna elements per facet, and wherein each facet is oriented at a different azimuthal angle relative to at least one other facet.

The number of directive gain antenna elements that can be selectively coupled to receive RF chains may exceed the number of receive RF chains that can accept receive RF signals from the one or more selectable RF connections.

The number of directive gain antenna elements that can be selectively coupled to receive RF chains may exceed the number of the plurality of receive symbol streams.

The measure of interference associated with each of the plurality of combinations of channel center frequency, channel bandwidth, and set of selective coupling settings may include a determination of an energy in each of a plurality of frequency bins using a Discrete Fourier Transform or a Fast Fourier Transform.

The determining the measure of interference associated with each of the plurality of combinations of channel center frequency, channel bandwidth, and set of selective coupling settings may be performed during a blanking interval. The blanking interval may include a number of transmit blocks during which one or more other backhaul radios presently in a communications link with the backhaul radio are expected to substantially inhibit transmissions.

The backhaul radio may further include an arbiter control entity, wherein the arbiter control entity is capable of sending and receiving one or more control signals or frames to and from the one or more other backhaul radios in order to mutually arrange the blanking interval.

The one or more performance metrics associated with each combination of channel center frequency, channel bandwidth may include at least one of or a weighted combination of a plurality of a signal to interference plus noise ratio (SINR), a link throughput, a latency, a jitter or a frame loss rate.

If the changing from the first combination to the second combination involves changing at least one of the channel center frequency or the channel bandwidth, then said changing may occur at a superframe boundary mutually agreed upon by the backhaul radio and one or more other backhaul radios present in a communications link with the backhaul radio.

The backhaul radio may be capable of determining a channel propagation characteristics assessment for a wireless link between at least one of one or more other backhaul radios, said channel propagation characteristics assessment associated with each of a plurality of combinations of channel center frequency, channel bandwidth, and set of selective coupling settings.

The determining or estimating the one or more performance metrics associated with each combination of channel center frequency, channel bandwidth, and set of selective coupling settings may also be based at least upon the channel propagation characteristics assessment. The determining or estimating the one or more performance metrics associated with each combination of channel center frequency, channel bandwidth, and set of selective coupling settings for at least one such combination may be based upon the channel propagation characteristics assessment as determined for a different channel center frequency within an instant operating band. The one or more performance metrics associated with each combination of channel center frequency, channel bandwidth may include at least one of a signal to interference plus noise ratio (SINR) or a link throughput, or a weighted combination of a signal to interference plus noise ratio (SINR) and a link throughput, or a weighted combination at least one of a signal to interference plus noise ratio (SINR) or a link throughput plus at least one of a latency, a jitter or a frame loss rate.

The backhaul radio may further include one or more adjunct antenna elements, wherein at least one of the one or more adjunct antenna elements has a larger azimuthal coverage pattern than any of the plurality of directive gain antenna elements that can be selectively coupled to at least one of the plurality of receive RF chains.

The backhaul radio may be capable of adaptive beamforming used to combine signals from a plurality of transmit antenna elements of the same transmit chain. The adaptive beamforming is performed in a closed-loop feedback mechanism and is coordinated between the transmitter and receiver.

In accordance with another aspect of the invention, a backhaul radio is disclosed that includes a plurality of receive radio frequency (RF) chains, wherein each receive RF chain is capable of converting from one of a plurality of receive RF signals to a respective one of a plurality of receive chain output signals; a plurality of directive gain antenna elements; and a processor at the receiver to compute and feedback the phase and STO for optimal beamforming.

In accordance with a further aspect of the invention, a fixed wireless access point is disclosed that includes a plurality of receive radio frequency (RF) chains, wherein each receive RF chain is capable of converting from one of a plurality of receive RF signals to a respective one of a plurality of receive chain output signals; a plurality of directive gain antenna elements; and a processor at the receiver to compute and feedback the phase and STO for optimal beamforming.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
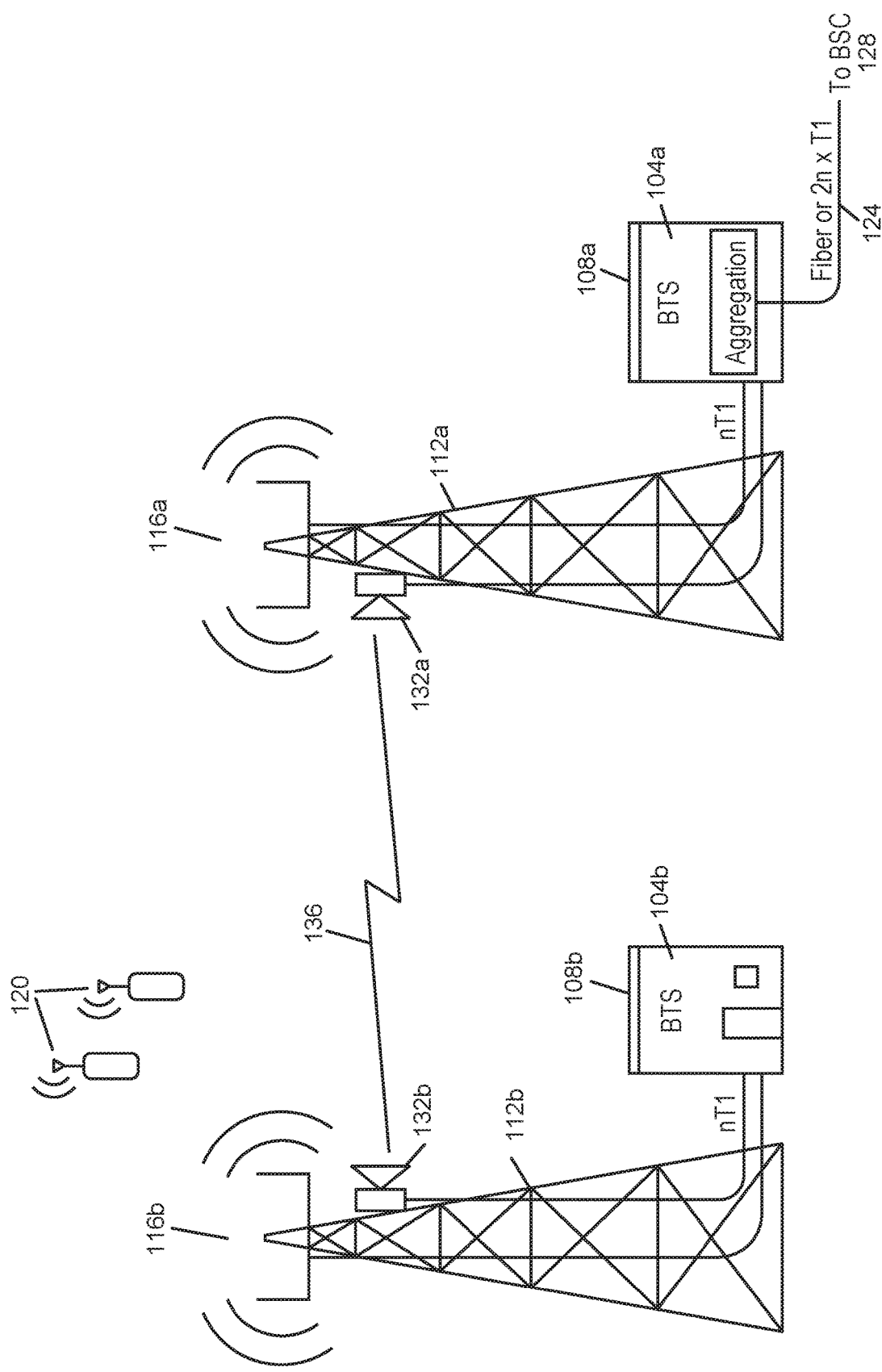
FIG. 1 is an illustration of conventional point to point (PTP) radios deployed for cellular base station backhaul with unobstructed line of sight (LOS).
Figure 2:
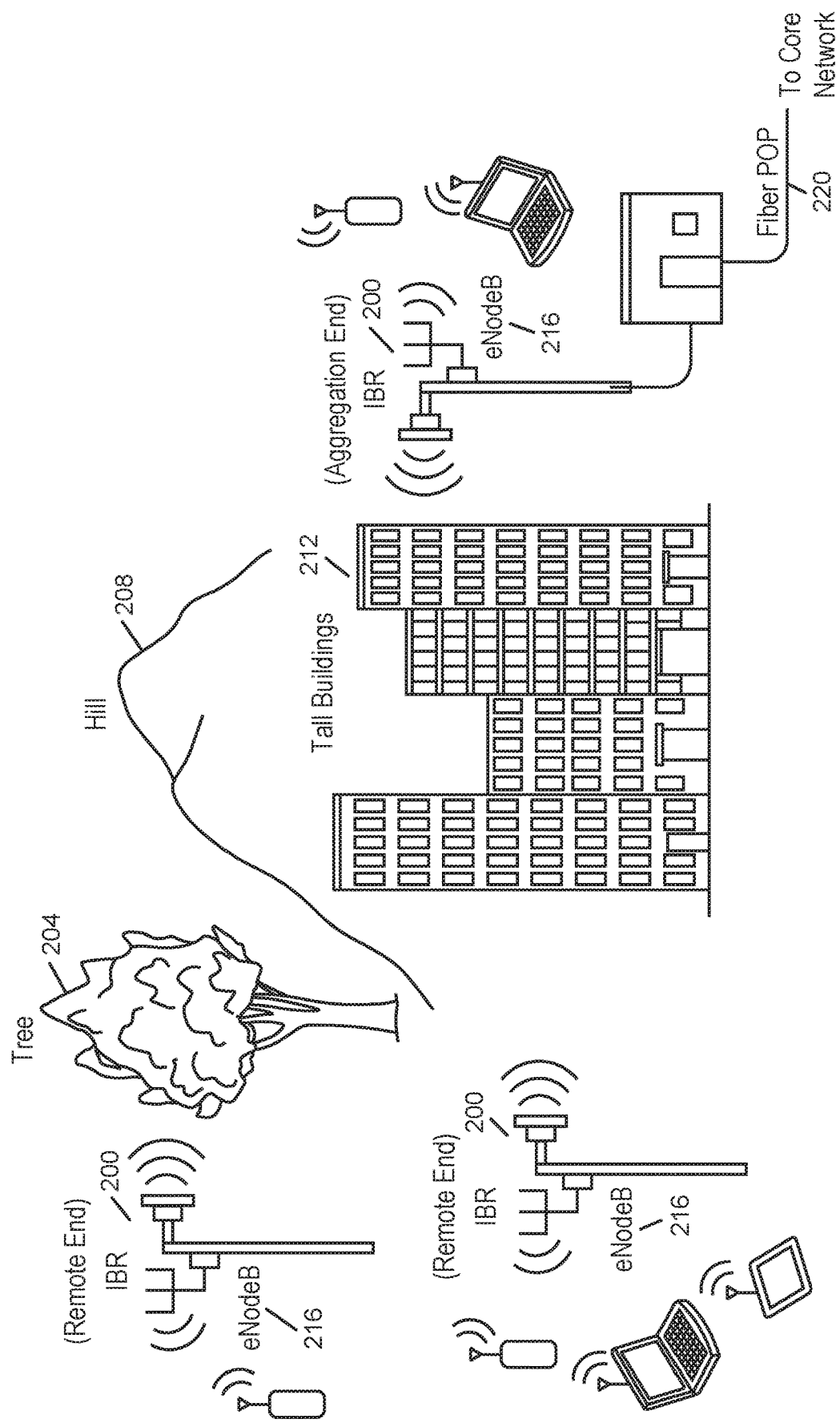
FIG. 2 is an illustration of intelligent backhaul radios (IBRs) deployed for cellular base station backhaul with obstructed LOS according to one embodiment of the invention.

FIG. 2 illustrates deployment of intelligent backhaul radios (IBRs) in accordance with an embodiment of the invention. As shown in FIG. 2, the IBRs 200 are deployable at street level with obstructions such as trees 204, hills 208, buildings 212, etc. between them. The IBRs 200 are also deployable in configurations that include point to multipoint (PMP), as shown in FIG. 2, as well as point to point (PTP). In other words, each IBR 200 may communicate with more than one other IBR 200.

For 3G and especially for 4$^{th}$ Generation (4G), cellular network infrastructure is more commonly deployed using "microcells" or "picocells." In this cellular network infrastructure, compact base stations (eNodeBs) 216 are situated outdoors at street level. When such eNodeBs 216 are unable to connect locally to optical fiber or a copper wireline of sufficient data bandwidth, then a wireless connection to a fiber "point of presence" (POP) requires obstructed LOS capabilities, as described herein.

For example, as shown in FIG. 2, the IBRs 200 include an Aggregation End IBR (AE-IBR) and Remote End IBRs (RE-IBRs). The eNodeB 216 associated with the AE-IBR is typically connected locally to the core network via a fiber POP 220. The RE-IBRs and their associated eNodeBs 216 are typically not connected to the core network via a wireline connection; instead, the RE-IBRs are wirelessly connected to the core network via the AE-IBR. As shown in FIG. 2, the wireless connections between the IBRs include obstructions (i.e., there may be an obstructed LOS connection between the RE-IBRs and the AE-IBR).

Figure 3:
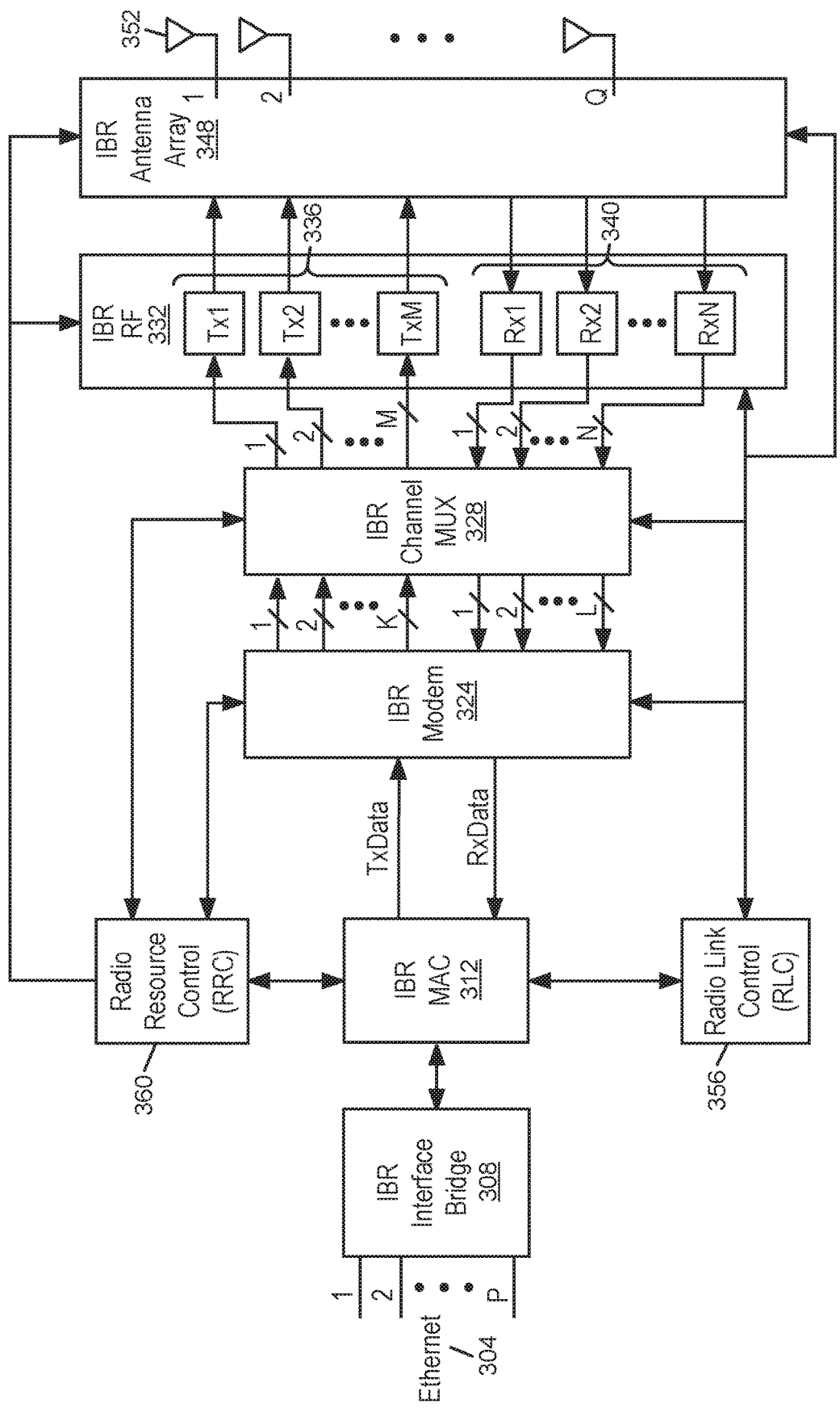
FIG. 3 is a block diagram of an IBR according to one embodiment of the invention.

FIG. 3 illustrates an exemplary embodiment of the IBRs 200 shown in FIG. 2. In FIG. 3, the IBRs 200 include interfaces 304, interface bridge 308, MAC 312, modem 324, channel MUX 328, RF 332, which includes Tx1 . . . TxM 336 and Rx1 . . . RxN 340, antenna array 348 (includes multiple antennas 352), a Radio Link Controller (RLC) 356 and a Radio Resource Controller (RRC) 360. The IBR may optionally include an Intelligent Backhaul Management System (IBMS) agent as shown in FIG. 7 of U.S. patent application Ser. No. 14/337,744. It will be appreciated that the components and elements of the IBRs may vary from that illustrated in FIG. 3. U.S. patent application Ser. No. 14/337,744 and the related applications and patents summarized above describe in detail the various elements of the IBR including their structural and operational features in numerous different embodiments both as depicted in FIG. 3 and as depicted with various additional elements not shown in FIG. 3. A brief summary of certain elements of the IBR is also provided herein.

The external interfaces of the IBR (i.e., the IBR Interface Bridge 308 on the wireline side and the IBR Antenna Array 348 (including antennas 352) on the wireless side) are a starting point for describing some fundamental differences between the numerous different embodiments of the IBR 200 and either conventional PTP radios or other commonly known radio systems, such as those built to existing standards including 802.11n (WiFi), 802.11ac (WiFi), 802.16e (WiMax) or 4G LTE.

In some embodiments, the IBR Interface Bridge 308 physically interfaces to standards-based wired data networking interfaces 304 as Ethernet 1 through Ethernet P. "P" represents a number of separate Ethernet interfaces over twisted-pair, coax or optical fiber. The IBR Interface Bridge 308 can multiplex and buffer the P Ethernet interfaces 304 with the IBR MAC 312. In exemplary embodiments, the IBR Interface Bridge 308 preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 312 schedules such frames for transmission according to policies configured within or communicated to the IBR 200, or the IBR interface bridge 308 schedules the transfer of such frames to the IBR MAC 312 such that the same net effect occurs. In other embodiments, the IBR interface bridge 308 also forwards and prioritizes the delivery of frames to or from another IBR over an instant radio link based on Multiprotocol Label Switching (MPLS) or Multiprotocol Label Switching Transport Profile (MPLS-TP). U.S. patent application Ser. No. 14/337,744 provides additional description of exemplary embodiments of the interfaces 304 and the interface bridge 308 of the IBR 200. U.S. patent application Ser. No. 13/632,993 provides additional description of exemplary embodiments of an IBMS that includes an IBMS Agent in communication with or IBMS components and the IBR Interface Bridge 308 as well as MAC 312 and/or RRC 360. U.S. patent application Ser. No. 13/632,993 also describes an IBR with an integrated Carrier Ethernet switch.

Figure 4:
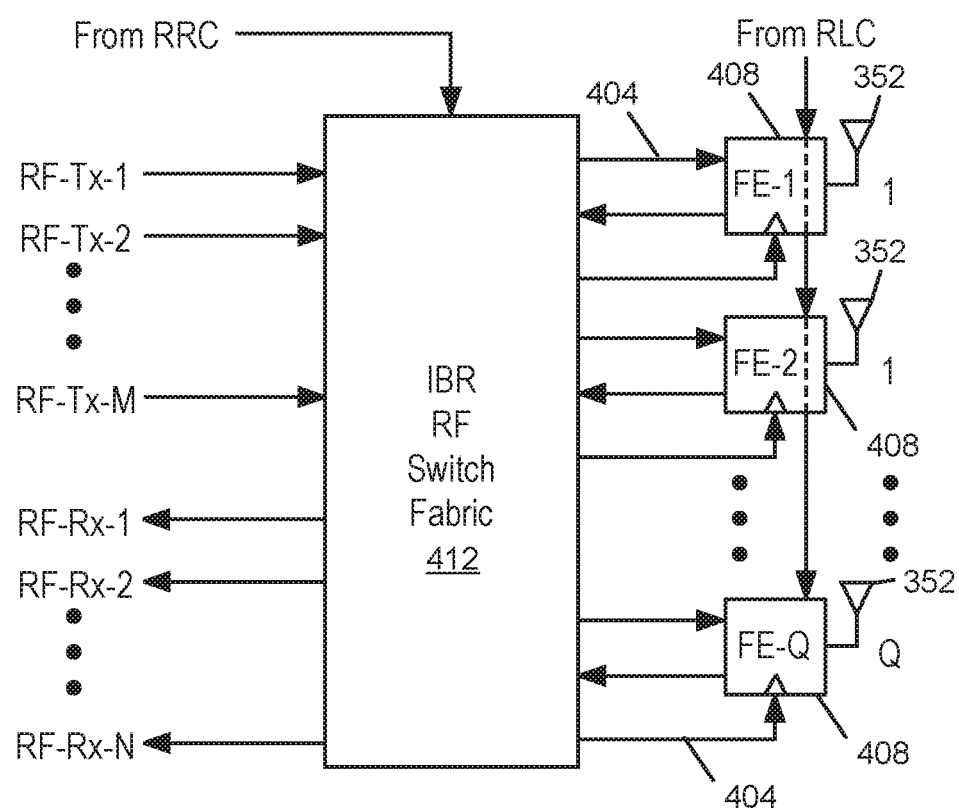
FIG. 4 is a block diagram of an IBR antenna array according to one embodiment of the invention.

FIG. 4 illustrates an exemplary embodiment of an IBR Antenna Array 348. FIG. 4 illustrates an antenna array having Q directive gain antennas 352 (i.e., where the number of antennas is greater than 1). In FIG. 4, the IBR Antenna Array 348 includes an IBR RF Switch Fabric 412, RF interconnections 404, a set of Front-ends 408 and the directive gain antennas 352. The RF interconnections 404 can be, for example, circuit board traces and/or coaxial cables. The RF interconnections 404 connect the IBR RF Switch Fabric 412 and the set of Front-ends 408. Each Front-end 408 is associated with an individual directive gain antenna 352, numbered consecutively from 1 to Q.

U.S. patent application Ser. No. 14/337,744, U.S. patent application Ser. No. 14/336,958, and U.S. patent application Ser. No. 14/108,200 provide additional description of the Front-end 408 and various embodiments thereof as applicable to different IBR duplexing schemes such as Time Division Duplexing (TDD), Frequency Division Duplexing (FDD) and Zero Division Duplexing (ZDD). For example, with TDD embodiments where certain directive gain antenna elements 352 are used for both transmit and receive at different times, then Front-end 408 may include a transmit/receive switch, one or more RF low pass and/or band-pass filters, and either a low-noise amplifier (LNA) in the receive path or a power amplifier (PA) in the transmit path. Similarly, with FDD embodiments where certain directive gain antenna elements 352 are used for both transmit and receive at the same time, then Front-end 408 may include a duplex filter, one or more additional RF low pass and/or bandpass filters, and either a low-noise amplifier (LNA) in the receive path or a power amplifier (PA) in the transmit path. Another common embodiment for FDD has certain directive gain antenna elements 352 used only for transmit and then Front-end 408 for such transmit antenna elements would have a PA and one or more RF filters for a transmit FDD sub-band and has certain directive gain antenna elements 352 used only for receive and then Front-end 408 for such receive antenna elements would have an LNA and one or more RF filters for a receive FDD sub-band. In most ZDD embodiments, certain directive gain antenna elements 352 are used only for transmit and others only for receive with respective Front-ends as described for FDD except that the RF filters overlap in the frequency domain for both transmit and receive (i.e. no separate transmit and receive sub-bands).

Note that each antenna 352 has a directivity gain Gq. For IBRs intended for fixed location street-level deployment with obstructed LOS between IBRs, whether in PTP or PMP configurations, each directive gain antenna 352 may use only moderate directivity compared to antennas in conventional PTP systems at a comparable RF transmission frequency. As described in greater detail in U.S. patent application Ser. No. 14/337,744, U.S. patent application Ser. No. 14/336,958, U.S. patent application Ser. No. 14/197,158, and U.S. patent application Ser. No. 14/108,200, typical values of Gq are on the order of 10 to 20 dBi for each antenna at RF transmission frequencies below 10 GHz.

In the IBR Antenna Array 348, the total number of individual antenna elements 352, Q, is at least greater than or equal to the larger of the number of RF transmit chains 336, M, and the number of RF receive chains 340, N. In some embodiments, some or all of the antennas 352 may be split into pairs of polarization diverse antenna elements realized by either two separate feeds to a nominally single radiating element or by a pair of separate orthogonally oriented radiating elements. In some embodiments, certain antenna elements 352 may be configured with different antenna gain Gq and/or radiation patterns compared to others in the same IBR. Also, in many embodiments, such as for those employing FDD or ZDD, U.S. patent application Ser. No. 14/337,744, U.S. patent application Ser. No. 14/336,958, U.S. patent application Ser. No. 14/197,158, and U.S. patent application Ser. No. 14/108,200 provide additional description of advantageous arrangements of separate transmit and receive antenna subsets with the total set Q of individual antenna elements 352.

The IBR RF Switch Fabric 412 provides selectable RF connections between certain RF-Tx-m and/or certain RF-Rx-n to the various individual antenna elements 352 via various front-end 408 embodiments. In exemplary embodiments, the RF Switch Fabric 412 is comprised of one or more RF switches where each RF switch has a selective set of one or mappings between the two or more RF ports on each switch. Note specifically that in certain embodiments the individual antenna elements 352 are coupled via a transmit-only front-end and/or the IBR RF Switch Fabric 412 to only a transmit chain output RF-Tx-m or coupled via a receive-only front-end and/or the IBR RF Switch Fabric 412 to only a receive chain output RF-Rx-n to advantageously enable separate optimization of the receive antenna array from that of the transmit antenna array. U.S. patent application Ser. No. 14/337,744, U.S. patent application Ser. No. 14/336,958, and U.S. patent application Ser. No. 14/108,200 provide additional description of different embodiments of the IBR RF Switch Fabric 412 as applicable to TDD, FDD and ZDD in different product configurations. Note further that other IBR embodiments may provide selectable RF connections between certain RF-Tx-m and/or certain RF-Rx-n to the various individual antenna elements 352 via various front-end 408 embodiments with structures different than the IBR RF Switch Fabric 412, as also disclosed at least in U.S. patent application Ser. No. 14/337,744. For example, certain IBR embodiments may utilize selective coupling structures between antenna elements and RF chains that comprise combiners or splitters where the phase and/or amplitude of a transmit or receive signal in certain paths of a combiner or splitter can be different from that of other paths. In some embodiments, such selective coupling structures may include one or more upconverters or downconverters such that at least one splitter or combiner may include at least one path at an intermediate frequency (IF). Alternatively, in some embodiments one or more switches in the implementation of the selectable RF connections may also operate at IF. In any of these embodiments, the actual instant selective coupling parameters such as a switch setting, or a path phase and/or an amplitude, or a splitting or combining path selection may be characterized by an appropriate set of selective coupling settings. In some IBR embodiments, the Radio Resource Control (RRC) 360 may generate or cause to be generated such a set of selective coupling settings.

With reference back to FIG. 3, the IBR RF 332 also includes transmit RF and receive RF chains 336, 340. In one embodiment, each element of transmit RF chain 336 takes a transmit chain input signal such as digital baseband quadrature signals $I_{Tm}$ and $Q_{Tm}$ and then converts them to a transmit RF signal RF-Tx-m at an RF carrier frequency typically below 10 GHz. Similarly, each element of receive RF chain 340 converts a receive RF signal RF-Rx-n at an RF carrier frequency typically below 10 GHz to a receive chain output signal such as digital baseband quadrature signals $I_{Rn}$ and $Q_{Rn}$. In exemplary embodiments, each receive RF chain comprises at least a vector demodulator and two analog to digital converters that are capable of producing such digital baseband quadrature signals $I_{Rn}$ and $Q_{Rn}$. Similarly, in exemplary embodiments, each transmit RF chain comprises at least a vector modulator and two digital to analog converters that are capable of operating from such digital baseband quadrature signals $I_{Tm}$ and $Q_{Tm}$. In other embodiments, the transmit RF and/or receive RF chains may operate at or operate with an intermediate frequency (or IF) that is also respectively upconverted or downconverted to the instant RF carrier frequency. Such upconverters or downconverters may be comprised within such transmit RF or receive RF chains. In some embodiments, such upconverters or downconverters may be comprised within the selectable RF connections as described above.

Other IBR elements include the IBR MAC 312, the Radio Link Control (RLC) 356, the Radio Resource Control (RRC) 360 and the optional IBMS Agent. Although IBR embodiments are possible wherein the MAC 312, RLC 356, RRC 360 and the optional IBMS Agent are distinct structural entities, more commonly IBRs are realized wherein the MAC 312, RLC 356, RRC 360 and the optional IBMS Agent as well as portions of the IBR Interface Bridge 308 are software modules executing on one or more microprocessors. Note also that in some IBR embodiments that use of a "Software Defined Radio" (SDR) for the IBR Modem 324 and/or IBR Channel MUX 328 or portions thereof may also be realized in software executing on one or more microprocessors. Typically in SDR embodiments, the one or more microprocessors used for elements of the PHY layer are physically separate from those used for the MAC 312 or other layers and are physically connected or connectable to certain hardware cores such as FFTs, Viterbi decoders, DFEs, etc. As SDR processing power increases over time, functions traditionally implemented in hardware cores advantageously migrate to the SDR processor cores as software modules for greater implementation flexibility.

The RRC 360 and RLC 356 may interact with the IBR MAC 312 and various elements of the IBR PHY at either the instant IBR or other IBRs in the instant link via "normal" frame transfers, direct local control signals via the conceptual IBR Control plane, or certain fields within a link control block that is transmitted periodically in certain superframes. Both the RRC 360 and the RLC 356 may execute concurrent control loops with the respective goals of optimizing radio resource allocations and optimizing radio link parameters for current resources in view of the dynamic propagation environment conditions (including uncoordinated interference if applicable), IBR loading, and possibly system-wide performance goals (via the optional IBMS Agent or other IBR to IBR control communications links). It is instructive to view the RLC 356 as an "inner loop" optimizing performance to current policies and radio resource allocations for each active link and to view the RRC 360 as an "outer loop" determining if different policies or radio resource allocations are desirable to meet overall performance goals for all IBRs currently interacting with each other (intentionally or otherwise). Typically both the RRC 360 and the RLC 356 are implemented as software modules executing on one or more processors.

The primary responsibility of the RLC 356 in exemplary IBRs is to set or cause to be set the current transmit Modulation and Coding Scheme (MCS) and output power for each active link. In an exemplary embodiment, the RLC 356 causes the transmit power control (TPC) of the IBR to be maintained both in a relative sense amongst active links, particularly of interest for the AE-IBR in a PMP configuration, and also in an overall sense across all transmits chains and antennas. In other embodiments, the RRC performs some or all of the transmit power control (TPC) functionality.

In some embodiments, the RLC 356 can determine its MCS and TPC selections across active links based on information from various sources within the IBR. For example, the IBR MAC can deliver RLC control frames from other IBRs with information from such other IBRs (for example, RSSI, decoder metrics, FCS failure rates, etc.) that is useful in setting MCS and TPC at the transmitting IBR. Additionally, such RLC control frames from an associated IBR may directly request or demand that the RLC in the instant IBR change its MCS and/or TPC values for transmit directly on either a relative or absolute basis. U.S. patent application Ser. No. 14/337,744 and U.S. patent application Ser. No. 14/108,200 provide additional description of different embodiments of the RLC 356 as applicable to TDD, FDD and ZDD in different product configurations. In other embodiments of the present invention, the link control block may be used in place of or in addition to such control frames to carry such information.

The primary responsibility of the RRC 360 is to set or cause to be set at least the one or more active RF carrier frequencies (or alternatively, active RF channel center frequencies), the one or more active channel bandwidths, the choice of transmit and receive channel equalization and multiplexing strategies, the configuration and assignment of one or more modulated streams amongst one of more modulator cores, the number of active transmit and receive RF chains, and the selection of certain antenna elements and their mappings to the various RF chains (the set of selective coupling settings). Optionally, the RRC may also set or cause to be set the superframe timing, the cyclic prefix length, and/or the criteria by which blocks of Training Pilots are inserted. The RRC 360 allocates portions of the IBR operational resources, including time multiplexing of currently selected resources, to the task of testing certain links between an AE-IBR and one or more RE-IBRs. The RRC 360 evaluates such tests by monitoring at least the same link quality metrics as used by the RLC 656. Additionally, in some embodiments, additional RRC-specific link testing metrics are also used. The RRC 360 can also exchange control frames or control signaling using the link control block with a peer RRC at the other end of an instant link to, for example, provide certain link testing metrics or request or direct the peer RRC to obtain link specific testing metrics at the other end of the instant link for communication back to RRC 360.

In some embodiments, the RRC 360 causes changes to current resource assignments in response to tested alternatives based on policies that are configured in the IBR and/or set by the optional IBMS Agent. An exemplary policy includes selecting resources based on link quality metrics predicted to allow the highest throughput MCS settings at lowest TPC value. Additional exemplary policies may factor in minimizing interference by the instant link to other AE-IBR to RE-IBR links (or other radio channel users such as conventional PTP radios) either detected at the instant IBRs or known to exist at certain physical locations nearby as set in configuration tables or communicated by the optional IBMS Agent or other IBR to IBR control communications links as described, for example, in co-pending U.S. patent application Ser. No. 14/098,456, the entirety of which is hereby incorporated by reference. For example, U.S. patent application Ser. No. 14/098,456 discloses exemplary systems and methods for control communications links in the form of inline or embedded signals that may be suitable for exchange of control information between IBRs that otherwise lack any IBR to IBR communication path. Such policies may also be weighted proportionately to reach a blended optimum choice amongst policy goals or ranked sequentially in importance.

In some embodiments, for either PTP or PMP deployment configurations, the selection of either the one or more active RF carrier frequencies used by the RF chains of the IBR RF, the one or more active channel bandwidths used by the IBR MAC, IBR Modem, IBR Channel MUX and IBR RF, the superframe timing, the cyclic prefix length, or the insertion policy for blocks of Training Pilots is determined at the AE-IBR for any given link. The RE-IBR in such an arrangement can request, for example, an RF carrier frequency or channel bandwidth change by the AE-IBR by sending an RRC control frame in response to current link conditions at the RE-IBR and its current RRC policies. Whether in response to such a request from the RE-IBR or due to its own view of current link conditions and its own RRC policies, an AE-IBR sends the affected RE-IBRs an RRC control frame specifying at least the parameters for the new RF frequency and/or channel bandwidth of the affected links as well as a proposed time, such as a certain superframe sequence index, at which the change-over will occur (or alternatively, denies the request). The AE-IBR then makes the specified change after receiving confirmation RRC control frames from the affected RE-IBRs or sends a cancellation RRC control frame if such confirmations are not received before the scheduled change. In some embodiments of the present invention, RRC may send such information on the link control block instead of or in addition to using control frames.

An RE-IBR typically attempts to utilize all available modulator and demodulator cores and streams as well as all available RF chains to maximize the robustness of its link to a particular AE-IBR. In an RE-IBR embodiment where at least some redundancy in antenna elements amongst space, directionality, orientation, polarization and/or RF chain mapping is desirable, the primary local RRC decision is then to set these various antenna selectivity options. In other embodiments the AE-IBR and RE-IBR optimize their resource allocations independently such that there is little distinction between the RRC strategies at the AE-IBR versus the RE-IBR. U.S. patent application Ser. No. 14/337,744, U.S. patent application Ser. No. 14/336,958, and U.S. patent application Ser. No. 14/108,200 provide additional description of different embodiments of the RRC 360 as applicable to TDD, FDD and ZDD in different product configurations.

The specific details of the IBR Modem 324 and IBR Channel MUX 328 depend somewhat on the specific modulation format(s) deployed by the IBR. In general, the IBR requires a modulation format suitable for a broadband channel subject to frequency-selective fading and multipath self-interference due to the desired PHY data rates and ranges in obstructed LOS propagation environments. Many known modulation formats for such broadband channels are possible for the IBR. Two such modulation formats for the IBR are (1) Orthogonal Frequency Division Multiplexing (OFDM) and (2) Single-Carrier Frequency Domain Equalization (SC-FDE). Both modulation formats are well known, share common implementation elements, and have various advantages and disadvantages relative to each other. U.S. patent application Ser. No. 14/337,744 provides additional detail regarding OFDM and SC-FDE as applicable to various IBR embodiments.

The specific details of the IBR Modem 324 and IBR Channel MUX 328 also depend somewhat on the specific antenna array signal processing format(s) deployed by the IBR. In general, the IBR utilizes multiple antennas and transmit and/or receive chains, which can be utilized advantageously by several well-known baseband signal processing techniques that exploit multipath broadband channel propagation. Such techniques include Multiple-Input, Multiple-Output (MIMO), MIMO Spatial Multiplexing (MIMO-SM), beamforming (BF), maximal ratio combining (MRC), and Space Division Multiple Access (SDMA). U.S. patent application Ser. No. 14/337,744 provides additional detail regarding such techniques as applicable to various IBR embodiments.

In many embodiments, the IBR Modem 324 comprises one or modulator cores each of which comprises such functional elements as scramblers, encoders, interleavers, stream parsers, symbol groupers and symbol mappers. At a high level, each modulator core within the IBR Modem 324 typically transforms a data stream from the IBR MAC 312 into a symbol stream that can be passed to the IBR Channel MUX 328. Similarly, in many embodiments, the IBR Modem 324 also comprises one or demodulator cores each of which comprises such functional elements as descramblers, decoders, deinterleavers, stream multiplexers, and soft decision symbol demappers. At a high level, each demodulator core within the IBR Modem 324 typically transforms a stream of estimated receive symbols, such as represented by a Log-Likelihood Ratio (LLR), from the IBR Channel MUX 328 into a data stream that can be passed to the IBR MAC 312. U.S. patent application Ser. No. 14/337,744, U.S. patent application Ser. No. 14/336,958, and U.S. patent application Ser. No. 14/108,200 provide additional description of different embodiments of the IBR Modem 324 as applicable to TDD, FDD and ZDD in different product configurations.

In many embodiments, the IBR Channel MUX 328 comprises a transmit path channel multiplexer that may or may not be frequency selective and that in turn may comprise such functional elements as block assemblers, transmit channel equalizers, transmit multiplexers, cyclic prefix adders, block serializers, transmit digital front ends, preamble inserters, and pilot inserters. At a high level, the transmit path of the IBR Channel MUX 328 transforms one or more symbol streams from the IBR Modem 324 into inputs for the one or more transmit chains each comprised of baseband symbol samples. Similarly, in many embodiments, the IBR Channel MUX 328 also comprises a frequency selective receive path channel multiplexer that in turn may comprise such functional elements as synchronizers, receive digital front ends, cyclic prefix removers, channel equalizer coefficients generators, receive channel equalizers, receive stream multiplexers and complex Discrete Fourier Transformers (DFT). Such exemplary frequency selective receive path channel multiplexers may also comprise at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT). At a high level, the receive path of the IBR Channel MUX 328 transforms the outputs of the one or more receive chains each comprised of baseband symbol samples into one or more streams of estimated receive symbols for input into the IBR Modem 324. U.S. patent application Ser. No. 14/337,744, U.S. patent application Ser. No. 14/336,958, and U.S. patent application Ser. No. 14/108,200 provide additional description of different embodiments of the IBR Channel MUX 328 as applicable to TDD, FDD and ZDD in different product configurations.

In exemplary embodiments, the IBR MAC 312 comprises such functional elements as a management entity, a Tx buffer and scheduler, a control entity, an Rx buffer, a frame check sum (FCS) generator, a header generator, a header analyzer and an FCS analyzer. U.S. patent application Ser. No. 14/337,744, U.S. patent application Ser. No. 14/336,958, and U.S. patent application Ser. No. 14/108,200 provide additional description of different embodiments of the IBR MAC 312 as applicable to TDD, FDD and ZDD in different product configurations.

Additional details regarding numerous optional functional components and regarding additional exemplary embodiments of the IBR are provided in commonly assigned U.S. patent application Ser. No. 14/337,744 and U.S. Pat. Nos. 8,811,365, 8,311,023 and 8,238,318, U.S. patent application Ser. No. 14/336,958 and U.S. Pat. Nos. 8,824,442 and 8,467,363, U.S. patent application Ser. No. 14/197,158, U.S. patent application Ser. No. 13/632,993 and U.S. Pat. Nos. 8,830,943, 8,761,100, and 8,300,590, and U.S. patent application Ser. No. 14/108,200 and U.S. Pat. Nos. 8,638,839 and 8,422,540, U.S. patent application Ser. No. 14/151,190, and U.S. patent application Ser. No. 14/098,456, the disclosures of which are hereby incorporated herein by reference in their entirety for all of the above.

In exemplary IBR embodiments, the superframe is typically on the order of 200 to 2000 μs duration and composed of transmit blocks of typically 10 to 30 μs duration. Typically each IBR superframe comprises multiple transmit blocks including at least one preamble block that may be used at least for synchronization and/or channel estimation (or for channel propagation characteristics assessment), at least one link control block that provides information such as the Modulation and Coding Scheme (or "MCS") for the data blocks in the instant or subsequent superframe, and at least several data blocks that can comprise control, management and/or user information bits. IBRs may advantageously optimize the superframe duration at either or both of startup or dynamically during operation to increase superframe duration at times of minimal interference when infrequent frequency agility in channel bandwidth and/or center frequency is required; thereby, minimizing the non-payload overhead associated with short duration superframes.

Alternatively, IBRs may advantageously optimize the superframe duration at either or both of startup or dynamically during operation to decrease superframe duration at times of significant interference that require continuous frequency agility in channel bandwidth and/or center frequency; thereby, minimizing the time required to make a channel bandwidth and channel center frequency change to correspond to minimally interfered frequency spectrum.

In other embodiments, IBRs may change channel center frequency and channel bandwidth on a block by block basis by signaling such changes in an FDD or ZDD scheme with control flags appended to a transmit block to minimize processing latency in receiving such control flags and making the signaled change. Upon changing channel bandwidth and/or center frequency, IBRs may use an immediate preamble block transmission to enable determination of updated channel estimation or may derive a temporary estimation for use until the next regularly scheduled preamble by interpolating, extrapolating and/or recalling from previously stored channel estimation.

In exemplary IBR embodiments, interference mitigation in the time domain is also enhanced by block level retransmission. This enables otherwise unmitigated interference that causes block errors at the receiver to be corrected at minimal latency to the affected data frame(s). Preferably in FDD and ZDD systems, an ACK or NACK is sent as a control flag with a block identifier to minimize latency in causing a transmitter to re-transmit a buffered block. In certain embodiments, such control flags and identifiers are appended to transmit blocks after all bit processing operations to minimize the block processing latency associated with such function as encoding, interleaving, scrambling, encrypting, etc. and their inverse operations at the receiver.

IBRs advantageously use a multitude of diverse receive antennas. In IBRs, the number of receive RF chains, each of which can be coupled to at least one distinct receive antenna, equals or exceeds the number of receive symbol streams and the number of distinct receive antennas that collectively provide diversity in the spatial domain exceeds the number of receive symbol streams. The spatial domain diversity may be achieved by distinct receive antennas that are i) separated physically in space, by at least one half wavelength but preferably by multiple wavelengths, ii) separated in directional orientation, in either azimuth or elevation but preferably at least such that their respective azimuthal beam widths do not substantially overlap, or iii) separated in polarization such as vertical and horizontal or other known orthogonal polarizations. Many embodiments of the IBR use a combination of at least two of the above spatial domain diversity alternatives and some embodiments of the IBR use a combination of spatial domain diversity based upon all three—physical separation, azimuthal orientation, and orthogonal polarization.

In certain IBR embodiments, multiple transmit antenna elements may be used to send the same transmit chain by adaptive beamforming. In such cases, signals from multiple transmit antenna elements must be processed at the transmitter to combine constructively over the air. Signals radiating from different transmit antenna elements experience different paths to the receiver. In order to combine the RF signals, they must be aligned in both phase and sample timing offset (STO). The beamforming optimization described for this invention requires the adjustment of both the phase and the STO at the transmitter.

The IBR may, at startup, apply open-loop beamforming in which an arbitrary phase is applied in order to increase the probability of the peer node discovery. Once a stable link is established, the transmitter and receiver will begin adaptive beamforming optimization through a closed-loop feedback mechanism. In closed-loop beamforming, the optimal beamforming parameters are estimated at the receiver and fed back to the transmitter through the reverse link.

Figure 5:
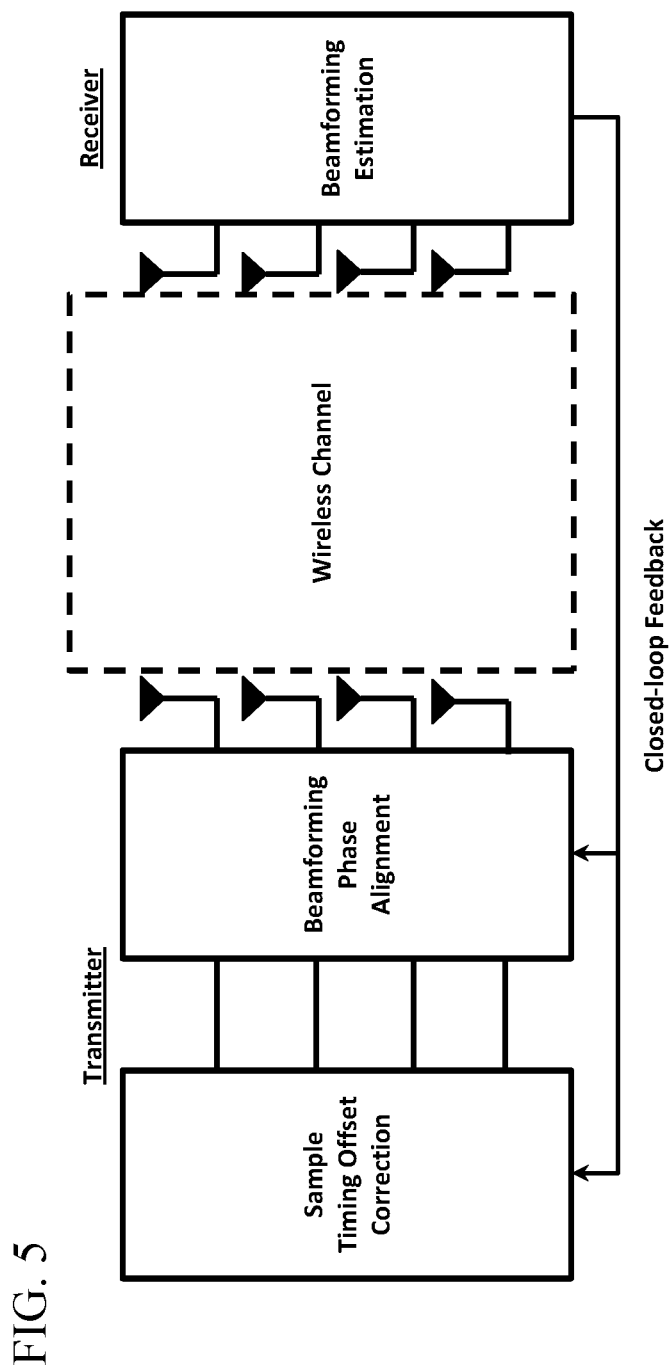
FIG. 5 is a block diagram illustrating the closed-loop feedback for beamforming optimization.

The illustration of the closed-loop feedback relationship is depicted in FIG. 5. The transmitter periodically sends a training sequence through the wireless channel. Using the training sequence, the receiver estimates the channel for each transmit and receive antenna element pair. The receiver then uses the channel estimate to compute the optimal STO and phase estimates for the current channel conditions. Once the estimates are ready, the receiver sends the estimates through the reverse link. The transmitter applies the STO correction and phase alignment according to the received feedback.

The channel is estimated at the receiver through a sounding preamble, which is a training sequence periodically sent by the transmitter. The sounding preamble is transmitted from all transmit antenna elements in the middle of the superframe. The timing of the sounding preamble is predetermined and is known at both the transmitter and receiver. The sounding preamble, which is a unique sequence for each transmit antenna element, is interleaved in frequency. For an embodiment with M transmit antenna elements, a tone is inserted every M subcarriers for each transmit antenna in the frequency domain. This allows each transmit antenna element to maintain orthogonality for the receiver to estimate the channel characteristic independently between each transmit and receive antenna elements across the operating bandwidth.

Figure 6:
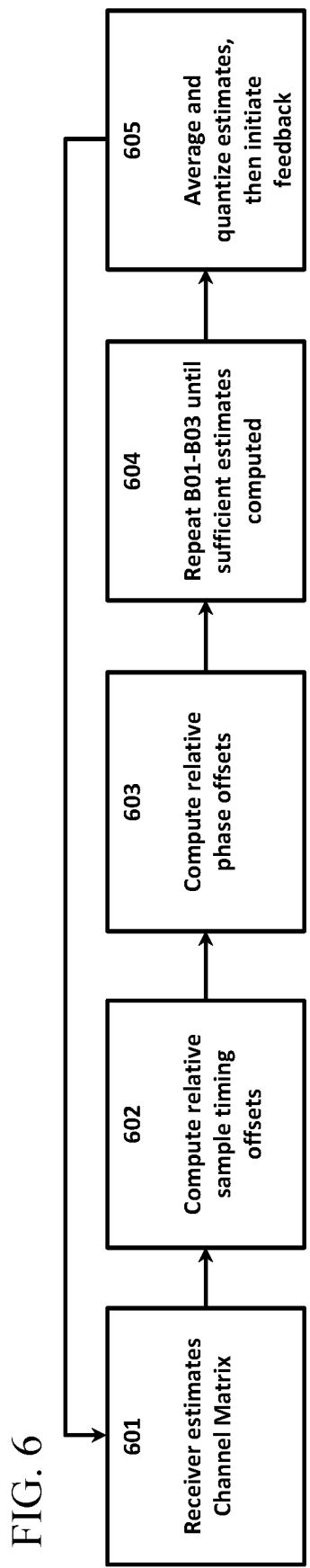
FIG. 6 is a block diagram illustrating steps in the beamforming optimization at the receiver.

FIG. 6 shows a procedure 600 that is performed within a processor at the receiver to compute and feedback the phase and STO for optimal beamforming according to one embodiment of the invention.

Procedure 600 begins by a channel estimation using the received sounding preamble. The channel matrix is estimated at the receiver using the sounding preamble (block 601). The receiver obtains the channel estimate by correlating the received signal with the known sounding preamble. Specifically, the receiver computes the channel estimate as $$\hat{H}_{rt}[k] = Y_{rt}[k] P_t^*[k],$$

where $Y_{rt}[k]$ is the received signal at receiver antenna rr from transmit antenna t for subcarrier k, and $P_t[k]$ is the known sounding preamble. The channel estimate is stored for each transmit and receive antenna pair and is used for the following steps for beamforming optimization.

Once the channel is obtained, the receiver estimates the STO for each element in the channel (procedure 602). The STO can be quantified by an absolute phase ramp across subcarriers in the frequency domain. The receiver uses the channel estimate to calculate the phase ramp across the subcarriers to find the STO for each transmit and receive antenna element pair. Specifically, the STO is estimated as $$\hat{\tau}_{rt} = \frac{K}{2\pi M} \text{angle}\left(\sum_{k=0}^{\frac{K}{M}-1} \hat{H}_{rt}[Mk]\hat{H}_{rt}^*[Mk+M]\right).$$

Simultaneously, the relative STO between the primary and alternate transmit antenna element is computed to feed back to the transmitter. This represents the sample offsets between the two transmit antenna elements. For each transmit antenna pair, the relative STO is computed between the primary transmit antenna element $t_0$ and the alternate transmit antenna element $t_1$. The receiver computes the relative STO as $$\Delta\tau_t = \frac{N}{2\pi T} \text{angle}\left(\sum_{r=0}^{R} \Psi_{rt_1}\Psi_{rt_0}^*\right) \Psi_{rt} = \sum_{n=0}^{\frac{N}{T}-1} \hat{H}_{rt}[Tn]\hat{H}_{rt}^*[Tn+T]$$

The receiver then computes the phase offsets across the transmit streams (block 603). In this stage, the receiver computes the phase offset between the primary and secondary transmit antenna elements, averaged over all receive antenna elements and frequency subcarriers. It is assumed that the phase does not vary over the operating bandwidth, and the estimate is averaged for all subcarriers. However, since the sounding preamble is placed in alternate subcarrier to maintain orthogonality, the computation must adjust for the subcarrier separation for the two transmit antennas. For example, if the sounding preamble offset was two subcarriers apart, the receiver computes the phase as $$\hat{\theta}_t = \text{angle}\left(\sum_{r=0}^{N} e^{\frac{j4\pi\tau_{rt_1}}{N}} \sum_{k=0}^{\frac{K}{M}-1} \hat{H}_{rt_0}^*[Mk]\hat{H}_{rt_1}[Mk+2] e^{\frac{-j2\pi M(\hat{\tau}_{rt_0}-\hat{\tau}_{rt_1})n}{K}}\right).$$

The steps in block 601 through 603 are repeated for multiple sounding preambles to obtain multiple samples of the beamforming estimates. The estimates are continued until a predetermined number of estimates are obtained (block 604). The duration of the averaging period may vary depending on the state of the link. For example, a short averaging period may be ideal for an initial estimate after changing the center receive frequency.

The estimates are averaged and quantized after a sufficient number of estimates have been obtained (block 605). The relative STO estimates are quantized into a half sample offset resolution in order to achieve a fine granularity. The phase estimates are quantized around the unit circle, ranging from 0 to 360 degrees. The averaged estimates are quantized into 8 bits each, and a feedback is initiated through the reverse link. Because the number of bits available for the feedback message is limited, the feedback is performed separately for the relative STO and phase estimate. In this invention, the relative STO and phase feedbacks are performed sequentially, in that order.

Once the feedback is received at the transmitter, the estimates are applied starting at the next frame. At the receiver, the average channel estimate used for equalization filtering is reset to prevent transient effects due to variation in the channel after beamforming changes.

At the transmitter, the STO is applied by adding integer number of samples leaving the front end. The transmit filters are adjusted to account for half sample offsets. Since the transmit filter is at twice the sampling frequency, adding a one tap delay is equivalent to removing half a sample from the transmitter. The two procedures are combined to apply the received STO feedback.

The phase feedbacks are applied by digitally multiplying samples leaving the front end by a unit magnitude phasor with the phase obtained according to the feedback. The phasor is multiplied to all samples except for the sounding preamble, which must be uniquely transmitted from each transmit antenna element. The same phasor is continuously applied at the transmitter until a new phase estimate feedback is obtained.

The receiver may also dynamically determine whether or not to use the beamforming estimates. For example, the performance of the link is not sensitive to small changes in beamforming phase. The receiver may locally store the phase estimates from the previously feedback. To prevent unnecessary feedbacks, the receiver may discard the estimate if the absolute difference between the current and previously fed back phase estimate is less than a predetermined amount.

Another consideration for beamforming feedback control is the effects of interference or noisy estimates. Noisy estimates can be particularly harmful to the link for the STO feedback, which requires nontrivial adjustments at the transmitter. The IBR may use statistics of the estimates, such as the maximum, minimum, mean, or variance to determine whether a feedback is appropriate for a given averaging period. For instance, it may not be suitable to send a feedback if estimates within an averaging period are largely varying. If the absolute difference between the maximum and minimum estimate during the averaging period is greater than a predetermined threshold, the STO estimate may be discarded for that window.

Although embodiments of the invention have been described primarily with respect to a backhaul radio, it will be appreciated that embodiments and aspects of the invention are also applicable to fixed wireless access points.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discrete blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A backhaul radio comprising: a plurality of receive radio frequency (RF) chains, wherein each receive RF chain is capable of converting from one of a plurality of receive RF signals to a respective one of a plurality of receive chain output signals; a plurality of directive gain antenna elements; and a processor at the receiver to compute phase and sample timing offset (STO) based on current channel conditions and provide feedback based on the computed phase and STO to a transmitter; wherein the processor is further configured to calculate a plurality of relative STOs and a plurality of relative phase offsets and average and quantize the plurality of relative STOS and the plurality of relative phase offsets to determine the feedback.

2. The backhaul radio of claim 1, wherein the processor is further configured to compute relative STOs and relative phase offsets.

3. The backhaul radio of claim 1, wherein the processor is further configured to receive channel matrix estimates.

4. The backhaul radio of claim 1, wherein the feedback comprises an adjustment of both the phase and STO.

5. The backhaul radio of claim 1, wherein the processor is further configured to perform a channel estimation using a received sounding preamble.

6. The backhaul radio of claim 5, wherein the channel estimation is performed by correlating a received signal with the received sounding preamble.

7. The backhaul radio of claim 1, wherein the processor computes the STO for each element in a channel.

8. The backhaul radio of claim 1, wherein the phase is computed after the STO is computed.

9. A method comprising: receiving a training sequence through a wireless channel from a transmitter; performing a channel estimation based on the received training sequence; computing phase and sample timing offset (STO) using the channel estimation to determine a feedback; providing the feedback to a transmitter; calculating a plurality of relative STOs and a plurality of relative phase offsets and averaging and quantizing the plurality of relative STOS and the plurality of relative phase offsets to determine the feedback.

10. The method of claim 9, further comprising computing relative STOs and relative phase offsets.

11. The method of claim 9, further comprising receiving channel matrix estimates.

12. The method of claim 9, wherein the feedback comprises an adjustment of both the phase and STO.

13. The method of claim 9, further comprising performing a channel estimation using a received sounding preamble.

14. The method of claim 13, wherein the channel estimation is performed by correlating a received signal with the received sounding preamble.

15. The method of claim 9, further comprising computing the STO for each element in a channel.

16. The method of claim 9, wherein the phase is computed after the STO is computed.

* * * * *